(12) United States Patent
Scheerhorn

(10) Patent No.: US 7,296,839 B2
(45) Date of Patent: Nov. 20, 2007

(54) SNAP-IN COUPLING ASSEMBLY

(75) Inventor: Daniel J. Scheerhorn, Holland, MI (US)

(73) Assignee: Johnson Controls Technolgy Company, Holland, MI (US)

( * ) Notice: Subject to any disclaimer, the term of this patent is extended or adjusted under 35 U.S.C. 154(b) by 0 days.

(21) Appl. No.: 10/542,559

(22) PCT Filed: Jan. 16, 2004

(86) PCT No.: PCT/US2004/001337

§ 371 (c)(1),
(2), (4) Date: Apr. 20, 2006

(87) PCT Pub. No.: WO2004/065174

PCT Pub. Date: Aug. 5, 2004

(65) Prior Publication Data

US 2006/0237985 A1  Oct. 26, 2006

Related U.S. Application Data

(60) Provisional application No. 60/440,543, filed on Jan. 16, 2003.

(51) Int. Cl.
*B60N 3/12* (2006.01)
(52) U.S. Cl. .................... 296/37.8; 296/24.34
(58) Field of Classification Search ............... 296/37.8, 296/24.34, 37.7; 224/539, 929
See application file for complete search history.

(56) References Cited

U.S. PATENT DOCUMENTS

| 4,809,897 | A | * | 3/1989 | Wright, Jr. ............... 224/539 |
|---|---|---|---|---|
| 5,520,313 | A | * | 5/1996 | Toshihide .................... 224/539 |
| 5,820,197 | A | | 10/1998 | Lanswer |
| 5,829,814 | A | | 11/1998 | Niessner et al. |
| 6,419,314 | B1 | * | 7/2002 | Scheerhorn ................. 296/37.8 |
| 6,663,155 | B1 | * | 12/2003 | Malone et al. ............. 296/37.8 |
| 6,719,343 | B2 | * | 4/2004 | Emerling et al. .......... 296/37.8 |
| 7,029,048 | B1 | * | 4/2006 | Hicks et al. ............. 296/24.34 |
| 7,114,755 | B1 | * | 10/2006 | Sturt et al. ............... 296/24.34 |
| 7,147,259 | B2 | * | 12/2006 | Radu et al. ................ 296/37.8 |
| 7,172,232 | B2 | * | 2/2007 | Chiku et al. ............. 296/24.34 |
| 2006/0108816 | A1 | * | 5/2006 | Radu et al. .............. 296/24.34 |

FOREIGN PATENT DOCUMENTS

| FR | 2 307 218 | 11/1976 |
|---|---|---|
| GB | 2 203 191 A | 10/1988 |
| JP | 59084643 | 5/1984 |

OTHER PUBLICATIONS

International Search Report for PCT/US2004/001337, date of mailing Jun. 21, 2004, 3 pages.

* cited by examiner

*Primary Examiner*—Kiran B. Patel
(74) *Attorney, Agent, or Firm*—Foley & Lardner LLP

(57) ABSTRACT

Coupling member for use with a first component having a projection and a second component includes a first portion and a second portion. At least one of the first portion and the second portion pivots between a closed position in which at least one of the first portion and the second portion is mechanically locked to the projection and an open position enabling the projection to be separated from the member. The member engages the second component to couple the first component to the second component. The second component engages the member to retain the member in the closed position.

17 Claims, 11 Drawing Sheets

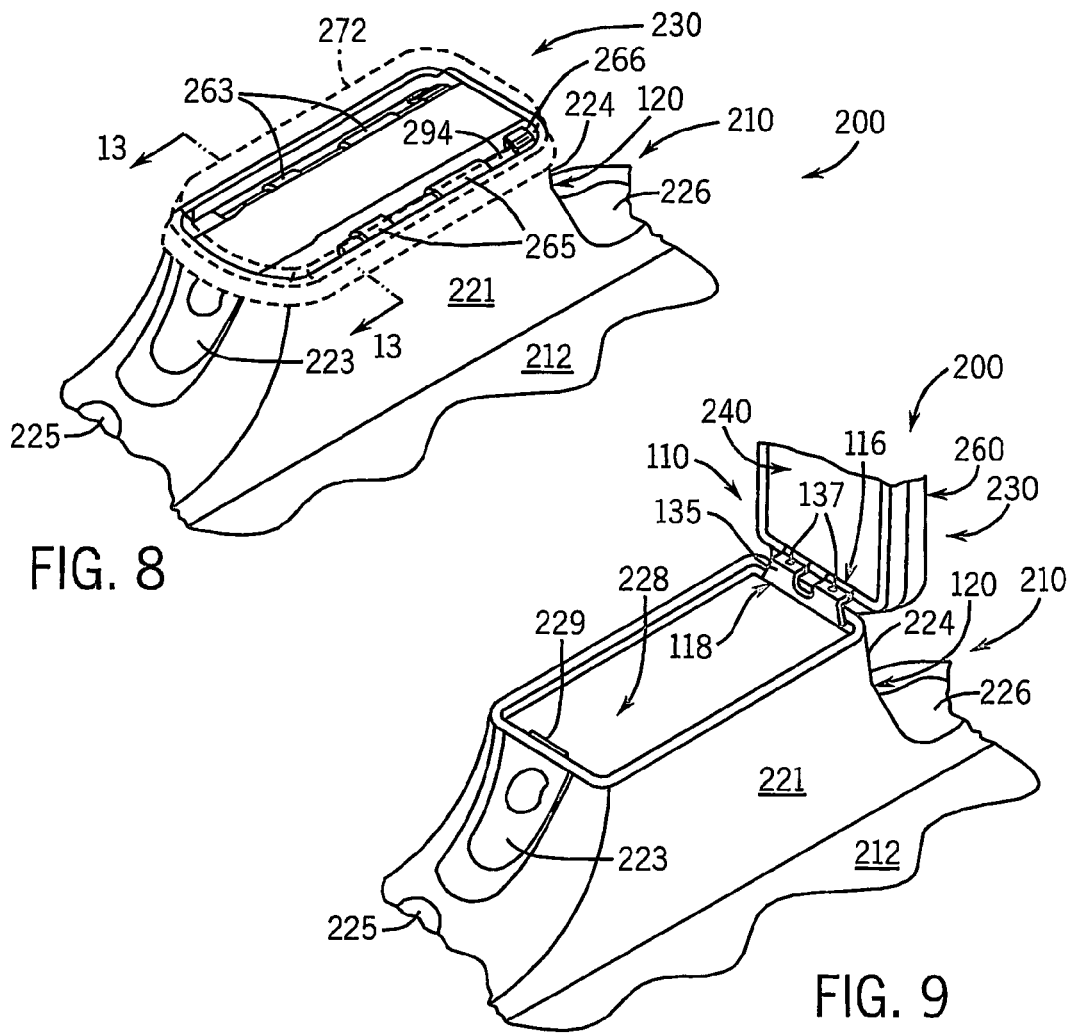
FIG. 8
FIG. 9
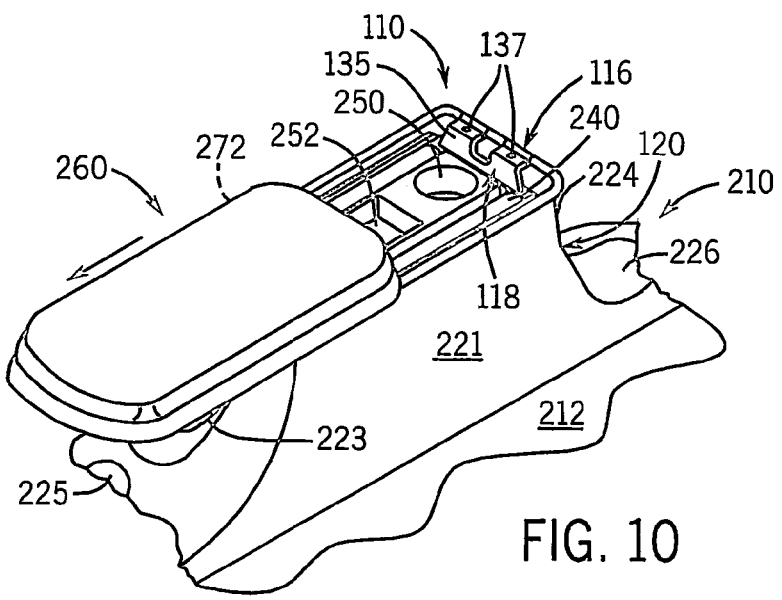
FIG. 10

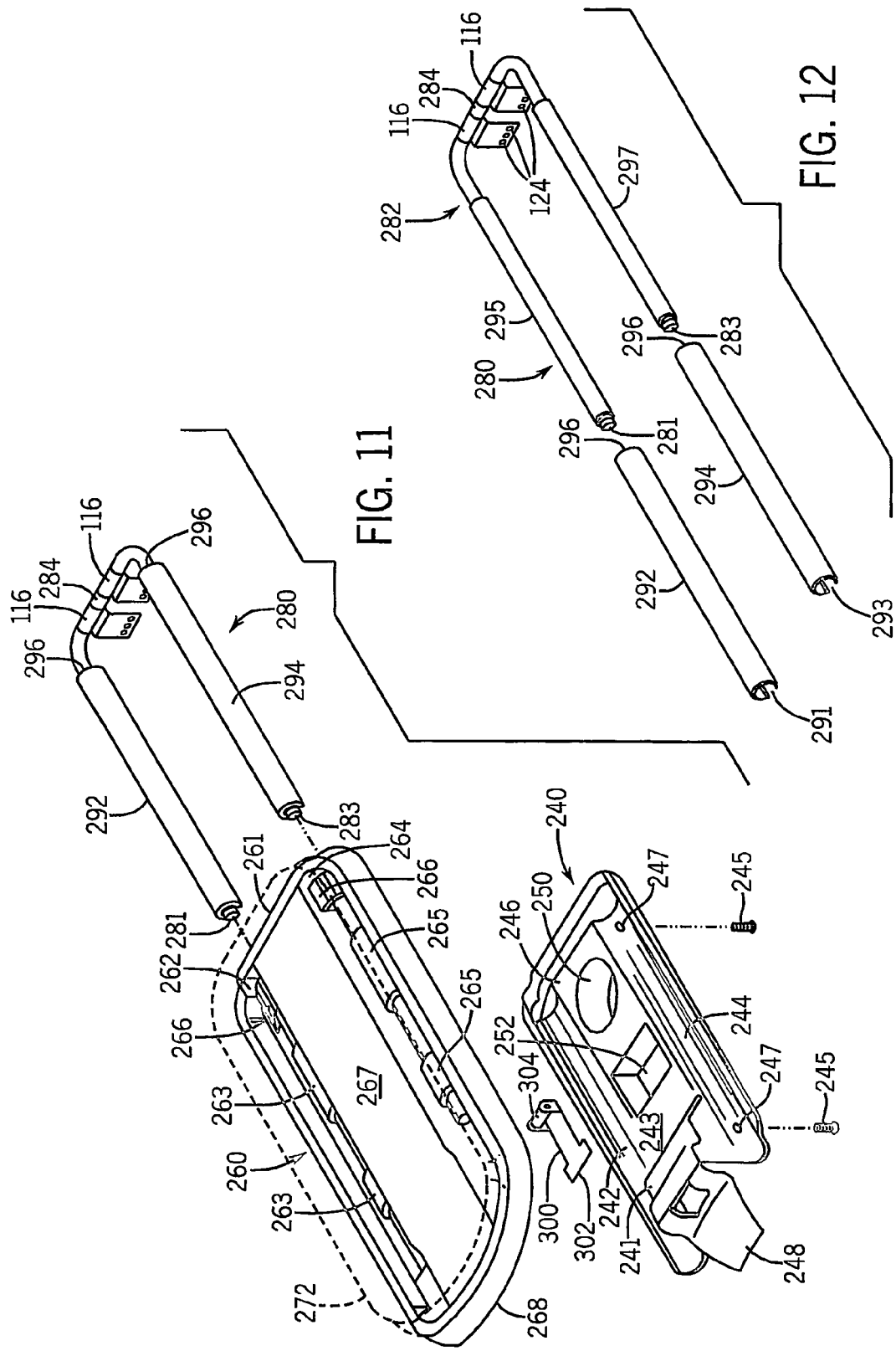

SNAP-IN COUPLING ASSEMBLY

CROSS REFERENCE TO RELATED APPLICATIONS

The present application claims priority under 35 U.S.C. § 119(e) from now abandoned U.S. Provisional Patent Application Ser. No. 60/440,543 filed on Jan. 16, 2003, by Daniel J. Scheerhorn, entitled "Snap-In Coupling Assembly," the full disclosure of which is hereby incorporated by reference.

FIELD OF THE INVENTION

The present invention generally relates to structures and mechanisms for coupling or connecting one component to another component. In particular, the present invention relates to structures or mechanisms for pivotally coupling or connecting one component to another component. Even more particularly, the present invention relates to a vehicle console having a cover pivotally coupled to a body.

BACKGROUND

A multitude of structures or assemblies are known to exist for coupling or connecting two components to one another. One example of where two components are coupled to one another is that of an armrest of a vehicle such as shown in U.S. Pat. No. 6,419,314. In this particular example, a cover is coupled to a console. In addition to being simply attached to the console, the cover is also pivotally supported relative to the console. As depicted in U.S. Pat. No. 6,419,314, this is achieved by the utilization of a pair of torque fittings that are crimped about a rod secured to the cover and that are further screwed to the console.

This known mechanism for coupling the cover component to the console component has several drawbacks. In particular, screwing the torque fittings to the console is tedious and time consuming, increasing assembly cost. The screws themselves must be inventoried, and reduce the aesthetic attractiveness of the armrest. Disassembling the armrest cover from the console is also complicated.

BRIEF DESCRIPTION OF THE DRAWINGS

FIG. 8 is a fragmentary perspective view shown partially in phantom form, a vehicle with a console and armrest assembly according to another embodiment of the present invention.

FIG. 9 is a fragmentary perspective view of the console shown in FIG. 8, shown with an armrest cover assembly in an open position for access to a storage compartment there below.

FIG. 10 is a fragmentary perspective view of the console shown in FIG. 8, showing the armrest cover assembly in a closed position with the cover moved to a forwardly adjusted position.

FIG. 11, is an exploded perspective view of the cover assembly.

FIG. 12 is an exploded perspective view of the slide assembly employed in the cover assembly.

DETAILED DESCRIPTION OF EXAMPLE EMBODIMENTS

Figure 1:
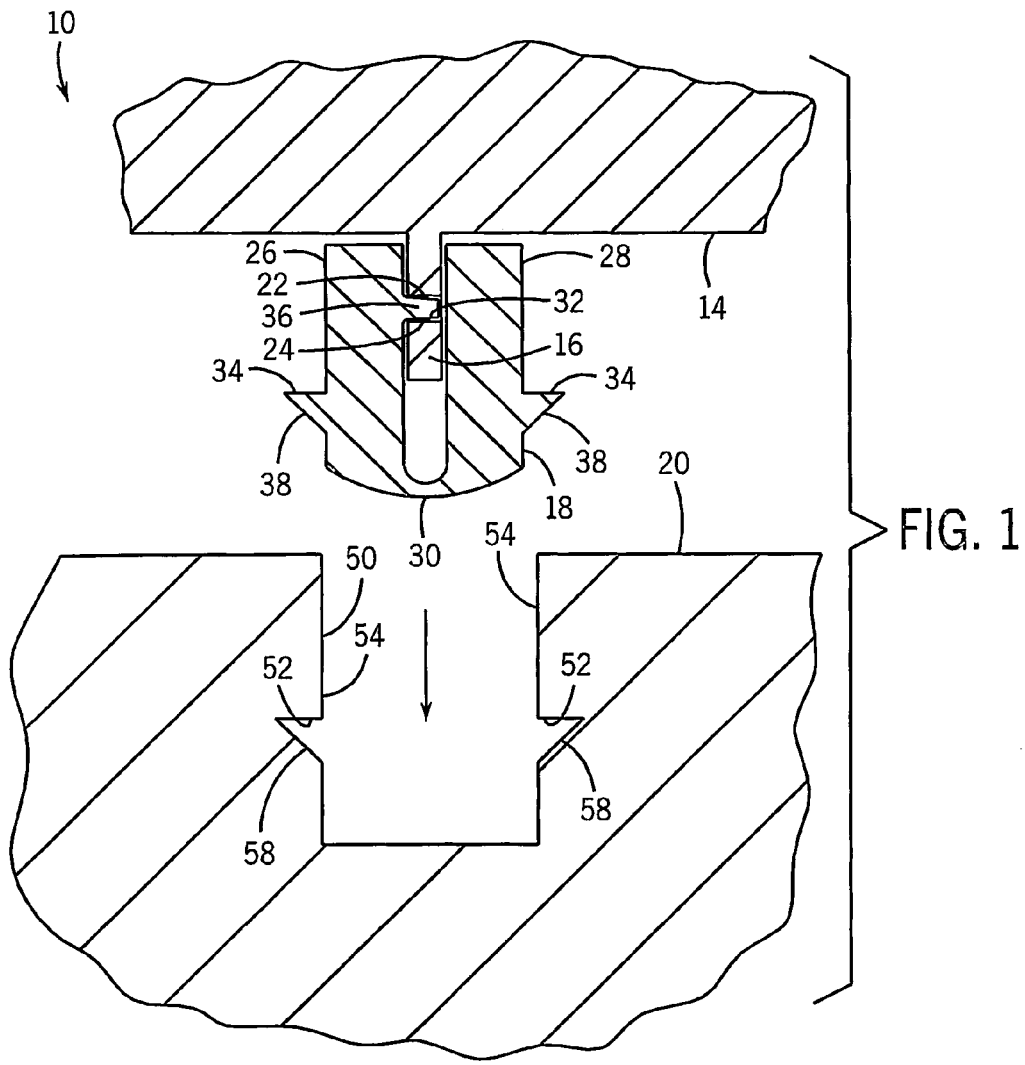
FIG. 1 is a sectional view schematically illustrating a coupling assembly according to one exemplary embodiment of the present invention.

FIG. 1 is a schematic view of a coupling assembly 10 which may be utilized in any of a variety of overall assemblies to connect to members or components to one another. In particular, FIG. 1 is a sectional view of a coupling assembly 10 prior to complete assembly. Coupling assembly 10 generally includes component 14, projection 16, coupling member 18 and component 20. Component 14 may comprise any structure or assembly which is intended to be coupled to component 20. For purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Projection 16 extends from component 14. Projection 16 may be integrally formed as part of a single unitary body with component 14, may be pivotally attached to component 14, may be fixedly attached to component 14 or may simply extend through component 14 and project from component 14. Although illustrated as being generally rectangular in shape and rectangular in cross section, projection 16 may have a variety of alternative configurations and sizes.

Projection 16 generally includes at least one detent surface 22 configured to mate with a corresponding detent-engaging surface provided on coupling member 18. In the particular embodiment illustrated, projection 16 includes at least one bore 24 providing surface 22. Alternatively, surface 22 may be provided by inwardly formed recesses extending into one or both sides of projection 16 or other conventionally known structures configured to provide a mechanical interlock.

Coupling member 18 generally comprises a member configured to mechanically interlock with projection 16 and at the same time, mechanically interlock with component 20 so as to couple components 14 and 20 to one another. In the example embodiment shown, member 18 connects to both projection 16 and component 20 without a need for optional fasteners such as screws, rivets and the like and without adhesives. Coupling member 18 generally includes portion 26, portion 28, pivot portion 30, detent-engaging surface 32, and detent-engaging surface 34. Portions 26 and 28 extend opposite to one another and are configured to generally extend on opposite sides of projection 16. Portions 26 and 28 are pivotally coupled to one another by pivot portion 30. Pivot portion 30 enables portions 26 and 28 to be pivoted to a closed position as shown in FIG. 1 in which detent-engaging surface 32 engages detent surface 22 and an open position in which portions 26 and 28 are separated from one another to an extent sufficient such that detent-engaging surface 32 is out of engagement with detent surface 22 and such that member 18, if not additionally secured by other means, may be removed from projection 16. In the particular embodiment illustrated, portions 26 and 28 are integrally formed as part of a single unitary body with one another and are connected to one another by portion 30 which comprises a living hinge. In such an embodiment, portions 26 and 28 may be molded or otherwise formed of a first material, while portion 30 is formed from a different, more flexible material. In yet other embodiments, portions 26, 28 and 30 may be formed from a single material (including a common mixture of materials), wherein pivot portion 30 is shaped and/or dimensioned so as to form a living hinge. Although less desirable, in still other embodiments, portions 26 and 28 may be pivotally coupled to one another by other conventionally known or future developed hinges, hinge structures and the like.

Detent-engaging surface 32 extends from portion 26 and is configured to engage detent surface 22 of projection 16 so as to mechanically interlock or secure member 18 to projection 16. In the particular embodiment illustrated, detent-engaging surface 32 is provided by a knob or projection 36 that is configured to extend at least partially into the bore 24 providing detent-engaging surface 22. Although projection 36 is illustrated as extending from portion 26, projection 36 may alternatively extend from portion 28. In other embodiments, both portions 26 and 28 may be provided with projections 36 which extend into a single bore 24 or which extends into distinct spaced apart bores 24. In lieu of the projection and bore locking structure shown, projection 16 and portions 26, 32 may be mechanically locked to one another by other conventionally known detent and detent-engaging surfaces such as hooks and recesses or the like. Furthermore, although projection 16 is illustrated as including a detent, while member 18 is configured as including a detent-engaging surface, this association may be reversed.

Detent-engaging surfaces 34 generally comprise surfaces associated with member 18 that are configured to engage corresponding detents provided in component 20. In the particular embodiment illustrated, detent-engaging surfaces 34 are provided by hooks or projections 38 extending from portions 26 and 28. Projections 38 are preferably formed from a material or are appropriately shaped or dimensioned such that projections 38 are resiliently flexible so as to enable projections 38 to elastically deform until an engagement with the detent surface is provided in component 20. Although less desirable due to increased complexity, in alternative embodiments, projections 38 may comprise distinct members coupled to member 18. In some embodiments, such distinct members may be movably coupled to member 18 and may further be resiliently biased to an outwardly extending position (as generally shown in FIG. 1) or a retracted position enabling insertion of member 18 into a portion of component 20. Such resilient biasing may be accomplished by the use of springs and the like. In alternative embodiments, projections 38 may be relatively rigid, wherein portions of component 20 adjacent to the detent surfaces are resilient in nature by the appropriate selection of materials and appropriate dimensioning or by the use of springs or other resiliently biasing mechanisms.

Component 20 generally comprises any structure, member or assembly which is desired to be coupled to component 14. Component 20 generally includes a recess, cavity or channel 50 and at least one detent surface 52. Channel 50 is generally configured to receive member 18. In addition, channel 50 is preferably configured such that upon receipt of member 18, the interior walls or surfaces 54 of channel 50 engage member 18 to retain portions 26 and 28 in the closed position, thereby preventing dislodgment or disengagement of detent surface 22 and detent-engaging surface 32. As a result, it is not critical that portions 26 and 28 be further secured in the closed position by additional means such as welding or the use of adhesive.

Detent surfaces 52 generally comprise surfaces formed along cavity 50 which are configured to engage detent-engaging surfaces 34 of member 18 when member 18 is inserted into slot or channel 50 so as to prevent inadvertent withdrawal of member 18 from channel 50. In the particular embodiment illustrated, detent surfaces 52 are provided by a pair of notches or recesses 58 extending outwardly from channel 50. Recesses 58 are sized so as to receive at least a portion of projections 38. Recesses 58 are preferably located such that member 18 is substantially received within channel 50 and such that component 14 is in relatively close proximity to component 20. In alternative embodiments, the space between components 14 and 20 may be varied depending on the particular application of coupling assembly 10.

In lieu of being provided by recesses 58, detent-engaging surfaces 52 may be provided by a variety of other known depressions, cut-outs or notches. In particular embodiments, at least portions of the interior surface of channel 50 may be made from a material or otherwise structured so as to be deformable or resiliently flexible, wherein during insertion of member 18 into channel 50, projections 38 outwardly deform or outwardly flex such surfaces so as to create opposing detent surfaces. In such an embodiment, insertion of member 18 into channel 50 would be facilitated but withdrawal of member from channel 50 would be substantially impeded. In such an embodiment, the resilient nature of the interior surfaces of channel 50 may be provided by the utilization of resiliently flexible material or may be provided by the utilization of movable surfaces along channel 50 which are resiliently biased by springs towards a projection-engaging and member-retaining position. Furthermore, although member 18 is illustrated as including detent-engaging surfaces 34 and component 20 is illustrated as including detent surfaces 52, this association may be reversed.

Figure 1A:
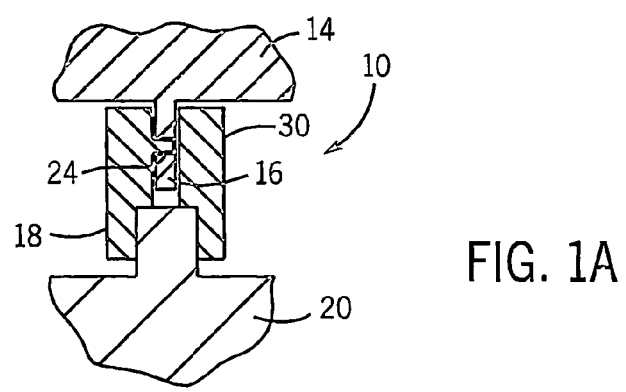
FIG. 1A is a sectional view schematically illustrating another exemplary embodiment of the coupling assembly of FIG. 1.

Moreover, although member 18 is illustrated as a male member configured to be inserted into a generally female component 20, this relationship may also be reversed. For example, the lower end of member 18 may be extended downwardly and may be provided with a cavity configured to receive a projection extending from component 20, wherein insertion of the projection of component 20 into the cavity of member 18 prevents portions 26 and 28 from pivoting away from one another and further retains detent-engaging surface 32 in engagement with detent surface 22. In such an embodiment, the projection extending from component 20 and the projection receiving recess of member 18 would be provided with corresponding detent and detent-engaging surfaces for retaining member 18 upon the projection of component 20. An example of this alternative structure is shown in FIG. 1A.

Coupling assembly 10 provides an inexpensive and clean mechanism for attaching two components to one another without being overly complicated, without requiring multiple pieces, such as screws, and without requiring extensive time to attach or detach components. Coupling assembly 10 is especially beneficial in those applications where projection 16 is formed from a material or is dimensioned such that projection 16 cannot be easily and directly coupled to another component such as component 20. For example, in applications where projection 16 is made from a material difficult to mold or otherwise form, member 18 provides an easy add-on that enables projection 16 and component 14 to be coupled to component 20. In other applications where component 16 is so thin that achieving necessary tolerances to snap projection 16 in place to component 20 is difficult, member 18 provides an easy add-on to projection 16, enabling such coupling.

FIGS. 2-7 illustrate a vehicle console 110 employing the structures and features of coupling system 10. Console 110 is part of a vehicle and generally includes cover 114, pivot arm 115 including projections 116 and member 118, and body 120. Cover 114 generally comprises a component configured to cooperate with body 120 so as to cover a portion of body 120 or an accessory associated with body 120. Cover 114 defines an armrest that generally includes a base 121 (shown in FIG. 5), rod 123, covering 125, and a padding material (not shown). Base 121 generally comprises a base structure of cover 114 that provides a rigid platform for supporting the remaining elements of cover 114. Rod 123 comprises a substantially rigid rod coupled to base 121 and configured to form a pivot axis about which cover 114 pivots. In the particular embodiment illustrated, rod 123 comprises a single U-shaped rod formed from cold rolled steel passing through base 121, passing through and across base 121 and along the exterior of base 121. In alternative embodiments, rod 123 may be formed from other rigid materials besides steel such as polymers and the like. Although less desirable, rod 123 may be composed of multiple sections joined to one another or may comprise a single linear rod coupled to base 121.

Covering 125 generally comprises a suitable flexible covering of upholstery-like material such as leather, fabric, vinyl or the like. Covering 125 cooperates with base 121 to capture and retain a padding material therebetween. In the particular embodiment illustrated, the padding material comprises injection-molded foam which fills the void between covering 125 and base 121 and which encapsulates those portions of rod 123 extending about the exterior of base 121. In alternative embodiments, the padding material may comprise other conventionally known cushioning material deposited, adhered or otherwise positioned between covering 125 and base 121. In still other embodiments, the padding material may be omitted, wherein covering 125 extends along base 121 or both the padding material and covering 125 may be omitted, wherein base 121 serves as the outer surface of covering 114.

Although less desirable, cover 114 may comprise any alternative structure composed of one or more materials configured to serve as a cover or top member with respect to body 120.

Pivot arm 115 generally comprises a structure pivotally coupled to rod 123 of cover 114 and configured to be snapped into engagement with body 120. In the particular embodiment illustrated, pivot arm 115 includes projections 116 and body 118. Projections 116 generally comprise elongate members that are pivotally connected to rod 123 at one end and that are coupled to member 118 at another end. During pivoting of cover 114, base 121 and rod 123 rotate with respect to projection 116 of pivot arm 115.

In the particular embodiment illustrated, projections 16 comprise torque fittings made from a resilient material such as a resilient metal like Martinsite. Projections 116 are crimped about and encircle rod 123 at locations within the interior of base 121. Preferably, polytetrafluoroethylene (TEFLON) is situated between rod 123 and projections 116. The provision of the TEFLON between projections 116 and rod 123 are generally of the nature disclosed in U.S. Pat. No. 6,419,314 and U.S. Pat. No. 5,820,197, the full disclosure relating to all subjects of which are hereby incorporated by reference. In particular, in one embodiment, those portions of projections 116 that face rod 123 are coated with a polymeric material. The coating can be an epoxy-based material or a polyester having from about 15-20% and nominally 17% of PTFE compounded with a base polymeric material. The thickness of the coating of one embodiment may be from about 0.0005 to 0.001 inch thick. Because projections 116 are preferably formed from a resilient material such as Martinsite, projections 116 resiliently return to their initial shape upon receiving excessive loading.

Projections 116 generally comprise elongate tabs extending from cover 114 and includes detent surfaces 122 which are formed by apertures 124 extending through projections 116. Although projections 116 are each illustrated as including three apertures 124 which are generally circular in shape, projections 116 may have greater or a fewer number of apertures 124 having a variety of different shapes and sizes. Overall, apertures 124 provide detent surfaces 122 which cooperate with member 18 to couple member 18 to projections 116.

Figure 2:
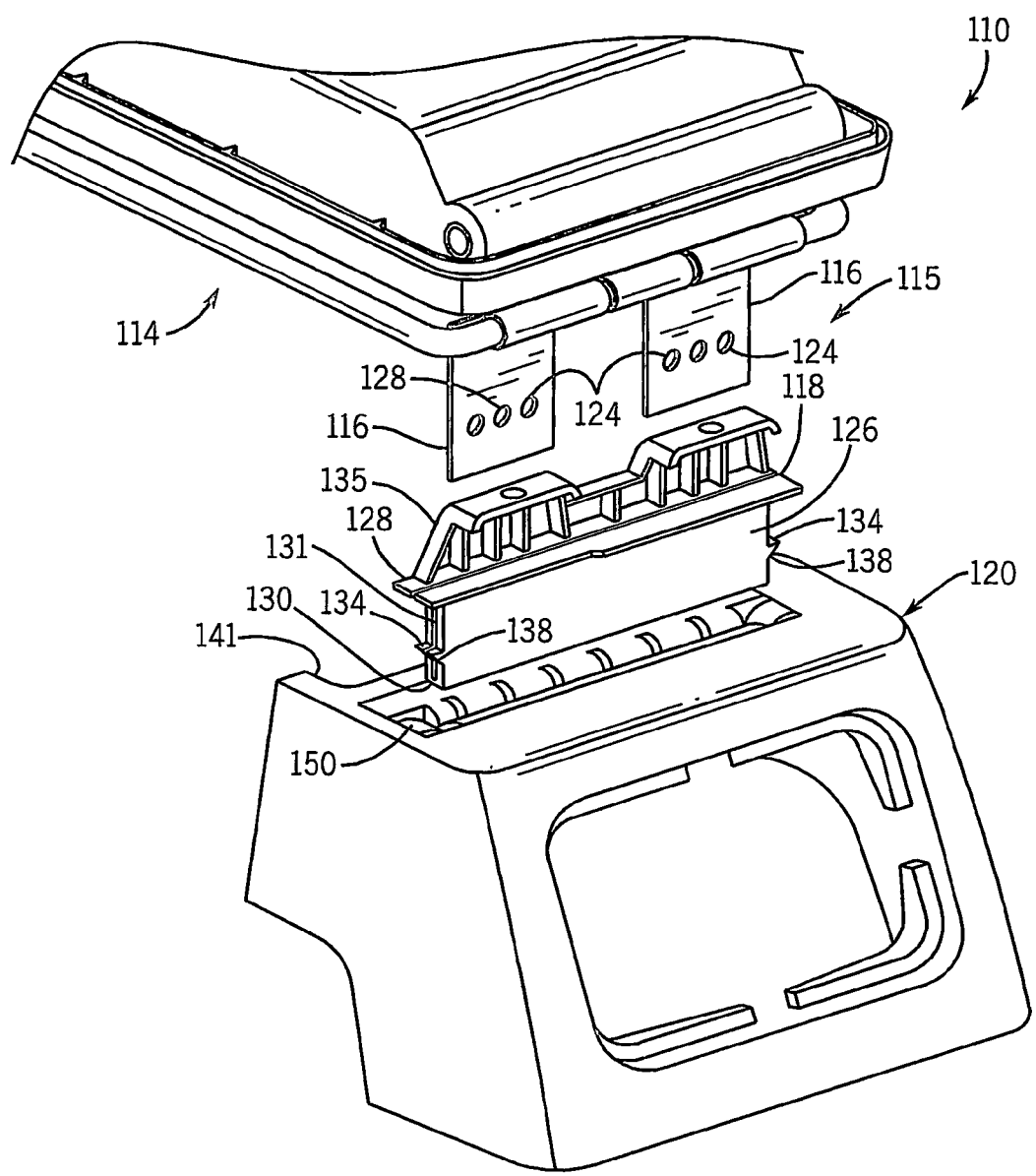
FIG. 2 is a fragmentary exploded rear perspective view of a vehicle console showing the structures and features of the coupling assembly of FIG. 1.
Figure 3:
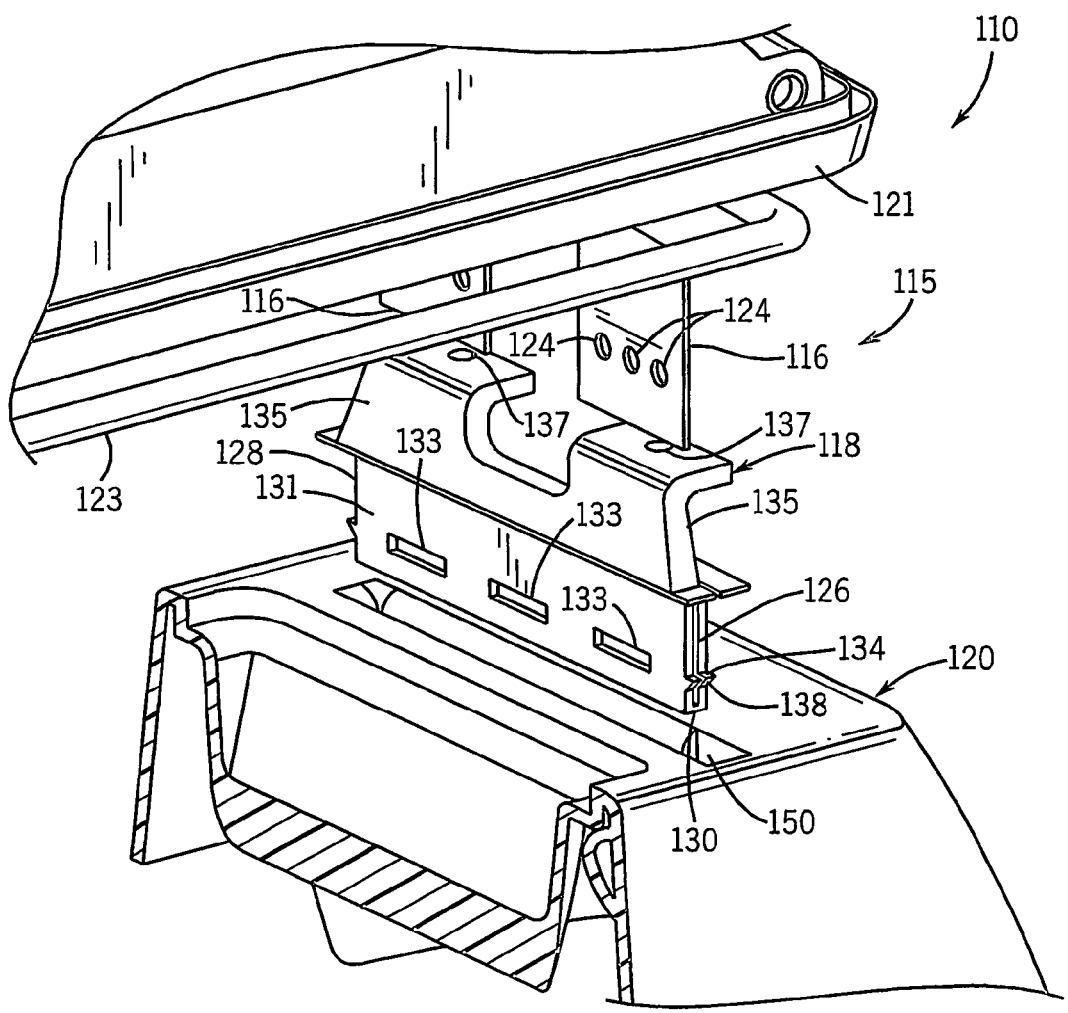
FIG. 3 is a fragmentary exploded front perspective view of a vehicle console of FIG. 2 according to an exemplary embodiment.
Figure 6:
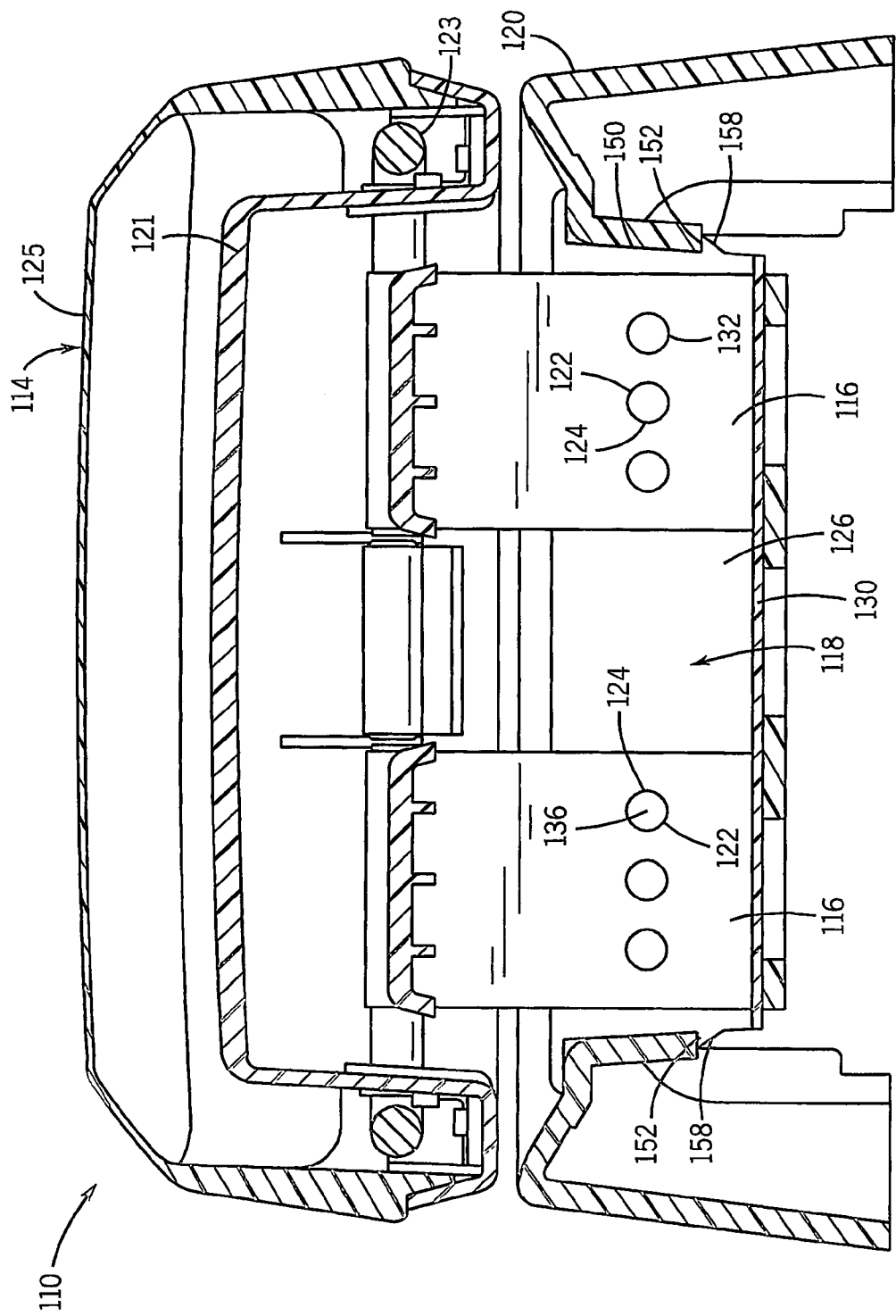
FIG. 6 is a sectional view of the vehicle console of FIG. 2 according to an exemplary embodiment.
Figure 7:
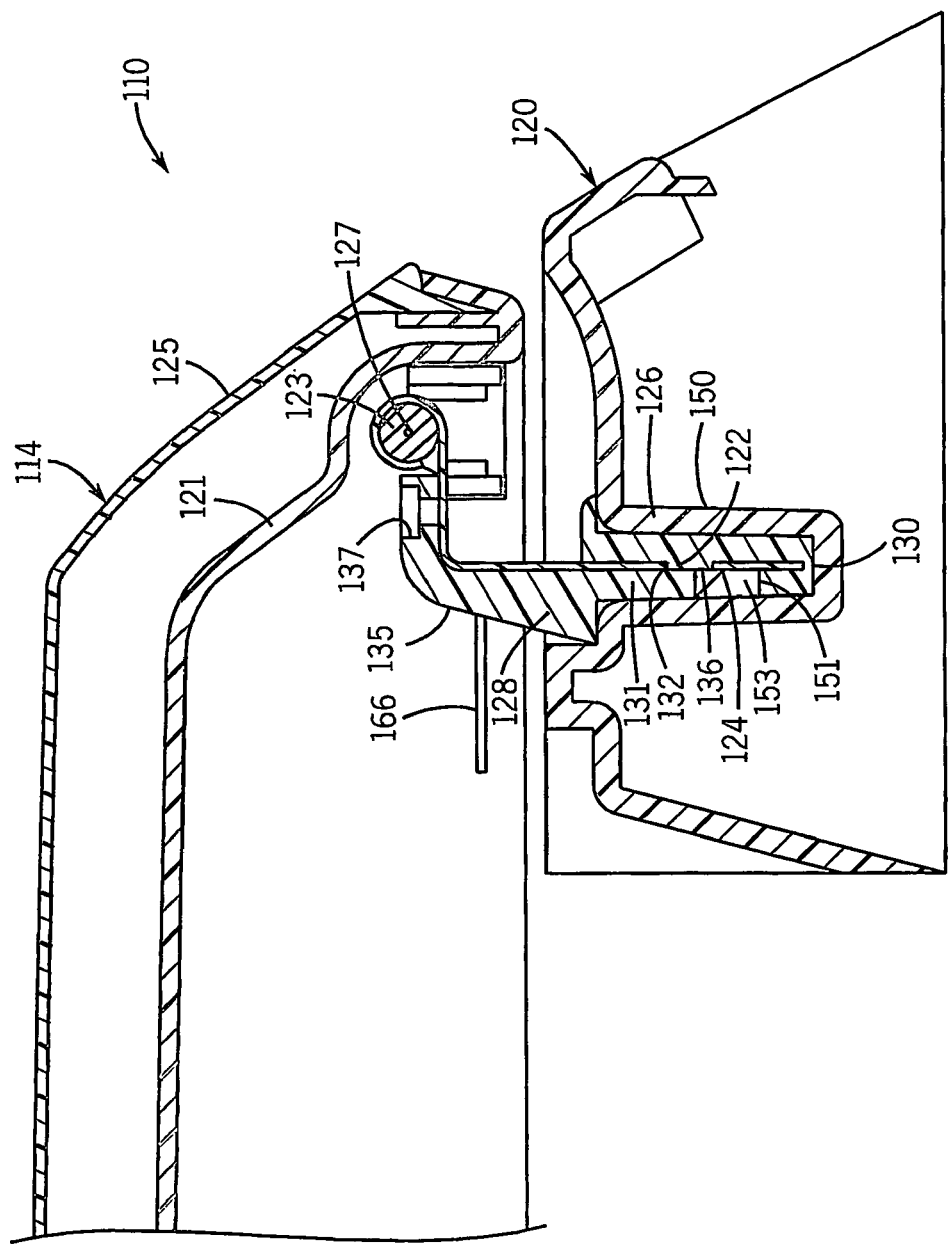
FIG. 7 is a sectional view of the vehicle console of FIG. 2 according to an exemplary embodiment.

Member 118 generally comprises a structure that is mounted or attached to projections 116. As best shown by FIGS. 2, 3 and 7, member 118 generally includes portion 126, portion 128 and pivot portion 130. Portions 126 and 128 are pivotally coupled to one another by pivot portion 130 and are configured to extend on opposite sides of projections 116. As best shown by FIGS. 6 and 7, portion 126 includes a plurality of detent-engaging surfaces 132 provided by a plurality of knobs or projections 136. In the particular embodiment illustrated, portion 126 is provided with six projections 136 which correspond to the six apertures 124 provided in projections 116. In alternative embodiments, portion 126 may have a greater or few number of projections 136 and the shape and configuration of projections 136 may be varied.

As best shown by FIGS. 2 and 3, portion 128 generally includes main portion 131, shroud portion 135 and detent surfaces 133. Main portion 131 extends generally across from portion 126 and provides a surface for detent surfaces 133. Detent surfaces 133 comprise depressions or cavities formed within main portion 131 and configured to engage a corresponding detent-engaging surfaces formed in body 120. Although detent surfaces 133 are illustrated as comprising three generally flat shoulder surfaces, detent surfaces 133 may have differing numbers, configurations and locations.

Shroud portion 135 projects from main portion 131 and is configured to cover or conceal those portions or surfaces of projections 116 extending beyond portion 126 and main portion 131. As a result, shroud portion 135 provides pivot arm 115 with a cleaner and more sturdier appearance. In the particular embodiment illustrated, shroud portion 135 has a generally upside down L-shape. As further shown by FIGS. 2 and 3, shroud portion 135 additionally includes countersinks 137 which are configured to receive the heads of fasteners. Although optional, countersinks 137 enable member 118 to be further secured to projections 116 by fasteners, such as screws, if desired.

As best shown by FIGS. 2 and 3, both portion 126 and portion 128 additionally include detent-engaging surfaces 134 generally located along the opposite edges of portions 126 and 128. Detent-engaging surfaces 134 are provided by triangular-shaped hooks or projections 138. Detent-engaging surfaces 134 are configured to engage corresponding detents formed in body 120.

Figure 4:
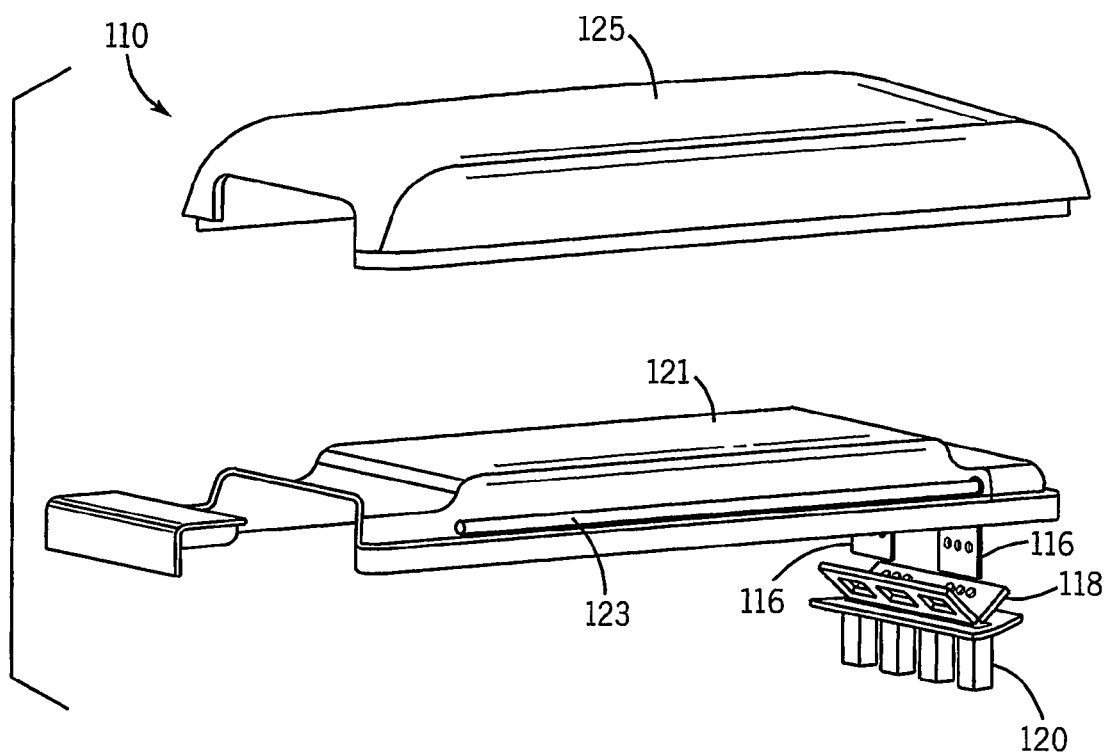
FIG. 4 is an exploded front perspective view of the vehicle console of FIG. 2 illustrating portions of a coupling member in an open position.

Pivot portion 130 connects portions 126 and 128. In the particular embodiment illustrated, pivot portion 130 is integrally formed as part of a single unitary body with both portions 126 and 128. Pivot portion 130 preferably forms a living hinge, enabling portions 126 and 128 to be pivoted to the closed position shown in FIG. 7 and an open position shown in FIG. 4. For purposes of illustration, FIG. 4 depicts only portions of body 120 and member 118. During assembly, portions 126 and 128 of member 118 are pivoted from the open position shown in FIG. 4 to a closed position about projections 116 as shown in FIG. 7. In the closed position, projections 136 extend through apertures 124 to secure portion 126 to projections 116. In alternative embodiments, portion 128 may additionally be provided with projections or apertures configured to secure portion 128 to projections 116. In the example embodiment illustrated, portion 128 is retained in the closed position relative to portion 126 upon insertion of member 118 into body 120 as will be described in greater detail hereafter.

Projections 136 and apertures 124 enable member 118 to be quickly and easily connected to projections 116 without fasteners, adhesives, welding or other arrangements. However, in alternative applications, member 118 may be additionally secured to projections 116 by the additional use of adhesives between portions 126 and 128 or between such portions and projections 116. Alternatively, welding or other securement methods may also be employed to couple member 118 to projections 116. In still other applications, pivot arm 115 may be formed by molding member 118 about projections 116, by forming member 118 and projections 116 as a single unitary body or by securing member 118 to projections 116 by welding, adhesives or the like without utilizing projections 136 and apertures 124.

In the particular embodiment illustrated, member 118 is formed from a polymeric material such as acetal. Alternatively, member 18 may be formed from a variety of other materials or composites.

Body 120 generally comprises a component of vehicle console 110 which serves as a structure for supporting cover 114. In the particular embodiment illustrated, body 120 forms an interior cavity or chamber 141 into which articles may be deposited and stored. In alternative applications, body 120 frames or otherwise supports other structures or components such as electronics, mirrors, control panels and the like which are at least partially or temporarily covered by cover 114.

As best shown by FIGS. 2, 6 and 7, body 120 provides an elongated slot 150 configured to receive pivot arm 115 and in particular, member 118. Along the interior surfaces of slot 150, body 120 includes detent-engaging surfaces 151 (shown in FIG. 7) provided by projections 153. Detent-engaging surfaces 151 are configured to engage and bear against detent surfaces 133 formed in member 118 when member 118 is inserted into slot 150. In the particular embodiment illustrated, body 120 includes three projections 153 which correspond to the three detent surfaces 133. In alternative embodiments, both member 118 and body 120 may be provided with a different number of detent and detent-engaging surfaces, as well as different shapes and configurations for such surfaces. Moreover, the association of the detent-engaging surfaces with body 120 and detent surfaces with member 118 may be reversed.

As best shown by FIG. 6, body 120 additionally includes detent surfaces 152 configured to be engaged by detent-engaging surfaces 134 upon insertion of member 118 into slot 150. Detent surfaces 152 are provided by notches or cut-outs 158 formed within body 120. Once again, in alternative embodiments, body 120 may alternatively comprise projections providing detent-engaging surfaces while member 118 includes detent notches providing detent surfaces for coupling member 118 to body 120. In the particular embodiments illustrated, body 120 is formed from a rigid polymeric material such as acrylonitrile butiadene styrene (ABS). Alternatively, body 120 may be formed from a variety of other polymeric or metallic compositions.

Figure 5:
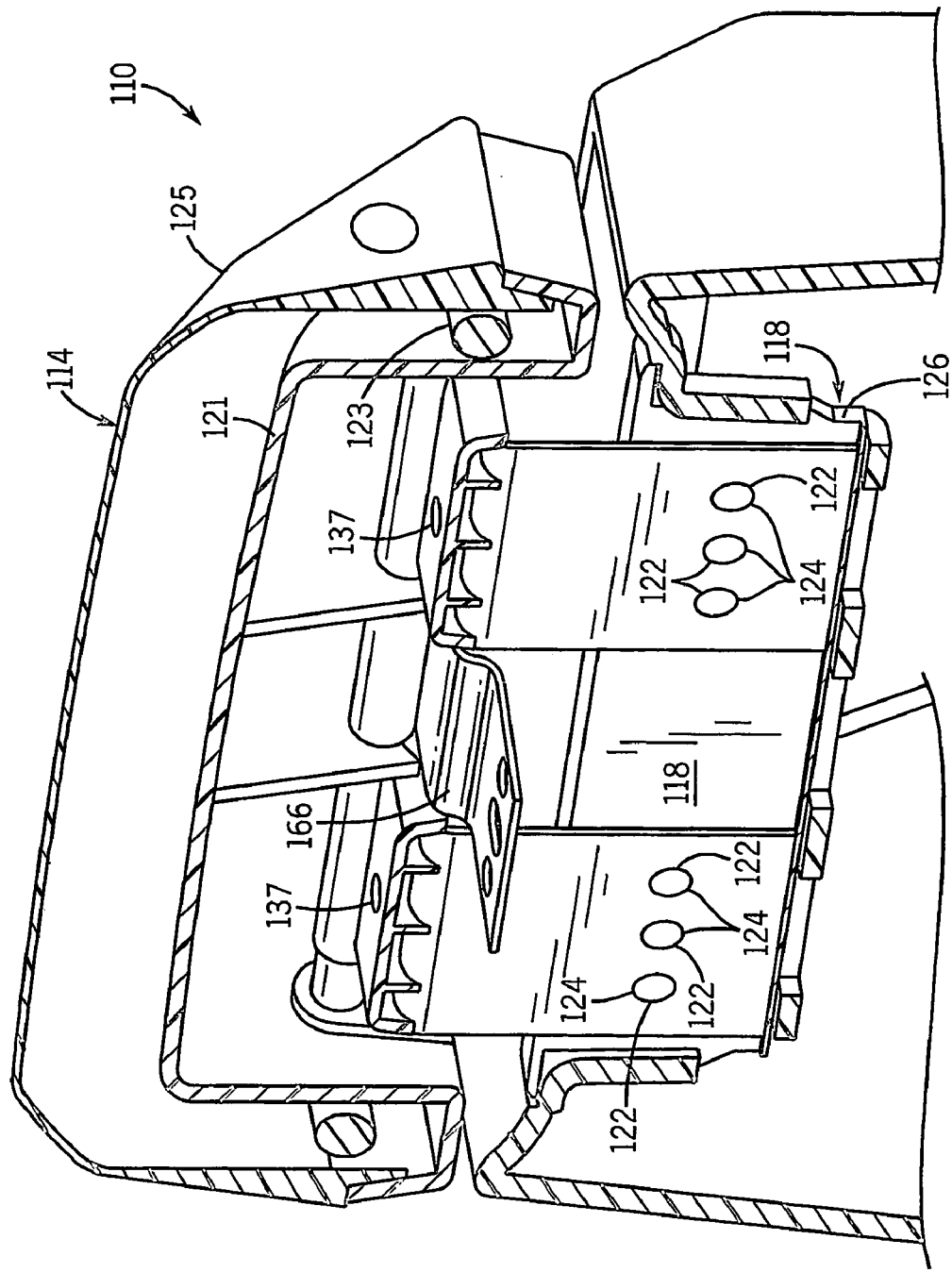
FIG. 5 is a perspective sectional view of the vehicle console of FIG. 2 according to an exemplary embodiment.

As best shown by FIG. 5, console 110 additionally includes a subcontainer pivot mount 166. Mount 166 generally comprises a resilient tab pivotally coupled to rod 123 and extending below base 121 in a generally horizontal orientation. In the particular embodiments illustrated, mount 166 comprises a Martinsite tang crimped about rod 123 (with intervening TEFLON) and mounted to a supplemental container or compartment which is configured to extend above cavity 141 and below cover 114. With this arrangement, cover 114 and the supplemental subcompartment (not shown) may both be pivoted about rod 123 to access compartment 141. Alternatively, only cover 114 may be pivoted about the axis of rod 123 to access the subcompartment.

Overall, vehicle console assembly 110 provides an effective means for pivotally coupling cover 114 to body 120 in a simple and cost-effective manner without requiring fasteners and a tedious and time-consuming assembly operation. In addition, it has been found that pivot arm 115 which snap fits into body 120 has improved ability to withstand rearward loading. Moreover, detachment of cover 114 from body 120 is simplified by simply requiring the use of a screwdriver or other tool to snap member 118 out of slot 150. Consequently, the replacement or repair of console 114 is also facilitated.

Although FIGS. 1-7 illustrate projections 116, member 118 and body 120 for use with console 110 which is configured for use with a pivoting subcompartment, projections 116, member 118 and body 120 may alternatively employ an armrest or other vehicle console structures in which cover 114 is configured to slide along rod 123 to provide access to a subcompartment. An example of such an alternative armrest assembly which may be improved by the use of projections 116, member 118 and body 120 is shown in U.S. Pat. No. 6,419,314 (the "'314 patent"), the full disclosure of which is hereby incorporated by reference. For example, FIGS. 8-14 illustrate a vehicle 200, such as an automobile, van, sport utility vehicle or truck, which includes a floor console 210 including projections 116, member 118 and body 220. Console 210 is mounted to a floor 212 of the vehicle between seats (not shown), such as a driver's and front passenger's seats, although could be located elsewhere in a vehicle. Console 210 includes a body 220 defining therein a storage compartment 228 (FIG. 9) having sidewalls 221, a rear wall 224, and a curved forward wall 223 which may integrally include a cup holder 225. The body 220 may also include a rear cup holder 226 for rear seat passengers. The storage compartment 228 is covered by a hinged cover assembly 230 embodying the present invention.

Assembly 230 includes a base 240 (as best seen in FIG. 11), a cover 260 and a slide assembly 280 which slidably couples the cover 260 to base 240. Base 240, in turn, is pivotally mounted to console 210 to pivot from a closed position (as shown in FIG. 8) to a pivoted open position (as shown in FIG. 8). Additionally, cover 260 can be moved forwardly to one of numerous adjusted positions, as seen in FIG. 10. As seen in FIG. 9, with cover assembly 230 in an open position, storage compartment 228 can be accessed by the vehicle operator or passenger. A latch 248 (FIGS. 10 and 13) on base 240 engages a latch catch 229 on the forward inside edge of wall 223 (FIG. 9) in a conventional manner. An explanation of the construction of cover assembly 230, including base 240, cover 260, and slide 280, is best understood by initially discussing the construction of slide assembly 280 with reference to FIGS. 10, 11, and 13.

Slide assembly 280 comprises a generally U-shaped solid steel rod 282 having a first elongated leg 281, a second elongated leg 283, and an integral base leg 284. Attached to the base leg is a pair of projections 116 for mounting and, therefore, slide assembly 280 to the top of rear wall 224 of body 220, as seen in FIG. 9. Projections 116 define a hinge for coupling the cover assembly 230 to body 220. Each projection 116 has an inner surface which is coated with polytetrafluoroethylene to control the rotation of base leg 284 and, therefore, the pivot opening of cover assembly 230 with respect to console body 220. The slide assembly 280 further includes a pair of sleeves 292 and 294 which can be extruded aluminum members having a generally C-shaped cross section, each with an open bottom slot 291 and 293, respectively, and an interior cross section which corresponds to that of polymeric intermediate slides 295 and 297 on rod legs 281 and 283 to provide a sliding interface between sleeves 292 and 294 and U-shaped rod 282 via the polymeric cylindrical slides 295 and 297. Slides 295 and 297 can be of any suitable lubricious polymeric material, such as a silicone-filled acetal such as CELCON.

Figure 13:
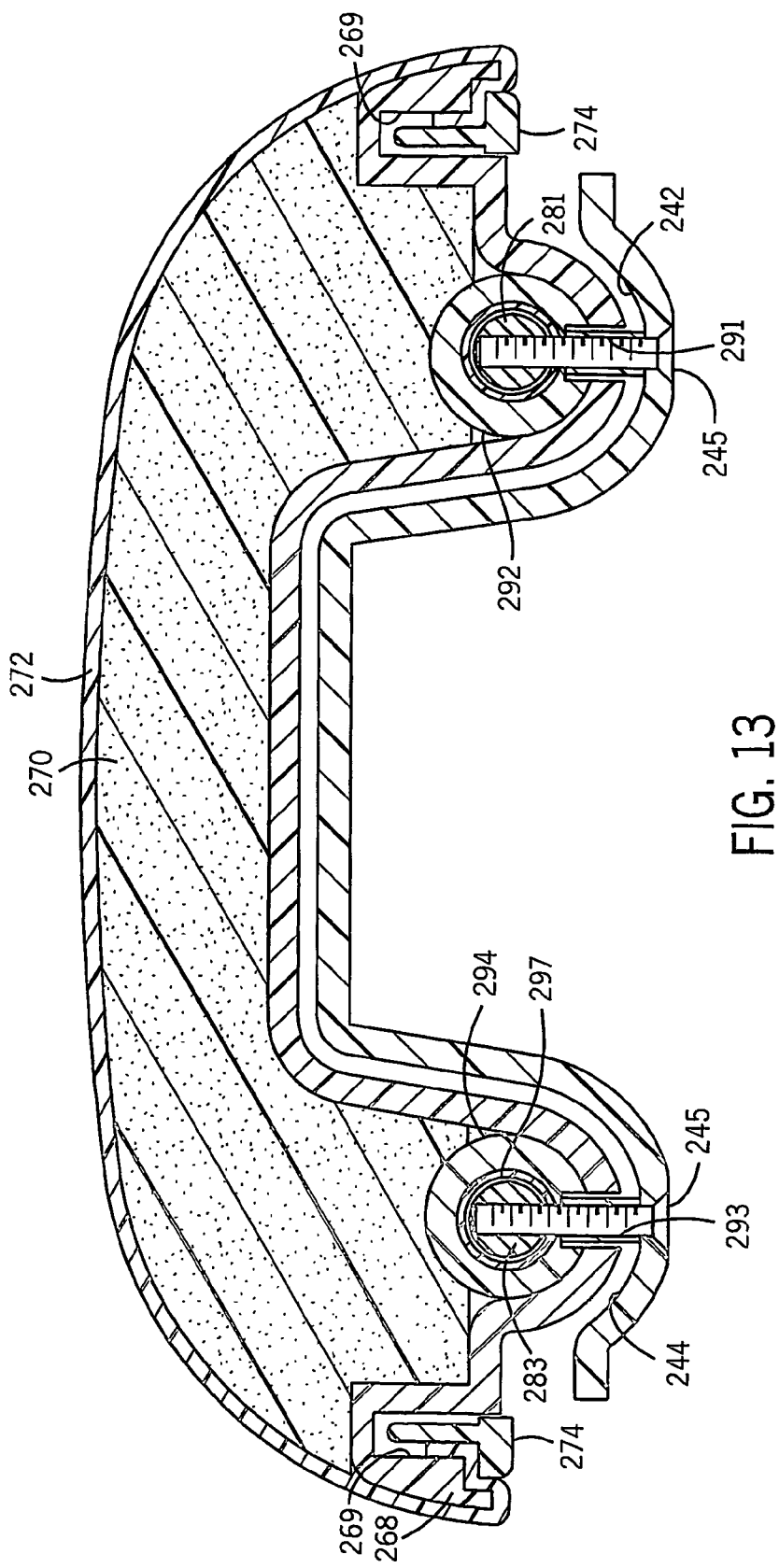
FIG. 13 is an enlarged cross-sectional view of the cover assembly taken along line 13-13 of FIG. 8.

The slide assembly 280, once molded, is secured to both the cover 260 and base 240 by inserting the sleeves 292 and 294 through openings 262 and 264 in end wall 261 of the integrally molded polymeric cover 260 and through semicylindrical guide bosses 263 and 265 spaced along the surface 267 of cover 260, as best seen in FIG. 11. The trailing edges 296 of each of the sleeves 292 and 294 are lockably held within the bosses of cover 260 by snap-locking tangs 266, which engage the edges 296 of the sleeves 292 and 294 to lockably hold the sleeves in fixed position with respect to cover 260. The legs 281 and 283 of rod 282 are secured to base 240 within semicylindrical troughs 242 and 244 by means of fastening screws 245, which extend through apertures 247 in troughs 242 and 244 in the base 240, as best seen in FIG. 13. Fasteners 245 extend through slots 291 and 293 of sleeves 292 and 294, respectively, thereby allowing cover 260, which is lockably mounted to the sleeves, to slide along legs 281 and 283 with fasteners 245 securing rod 282 to base 240 and clearing the sleeves 292, 294 during such motion.

Cover 260 defines an armrest in a preferred embodiment and includes, as seen in FIGS. 7-9 and 13, a foam polymeric padded section 270 with a suitable flexible covering upholstery material 272, which can be leather, fabric, vinyl or the like, which extends around the outer peripheral edges 268 of cover 260 and is tucked into locking engagement in a peripheral trough 269 therewith by means of a locking ring 274, as best seen in FIG. 13. Base 240 and the body of cover 260 are each integrally molded of a suitable polymeric material such as polycarbonate, thermoplastic resin, or the like, typically used in the automotive environment for interior components.

With base 240 secured to rod 282, which is pivotally mounted to the console wall 224, the entire cover assembly, including base 240 and slidable cover 260, can be pivoted to a raised open position exposing storage compartment 228, as shown in FIG. 9, by disengaging latch 248 from catch 229 (FIG. 9). The cover 260 can also be slid with respect to base 240, as seen in FIG. 10, to multiple detented positions by the detent mechanism shown in FIGS. 11 and 14.

Figure 14:
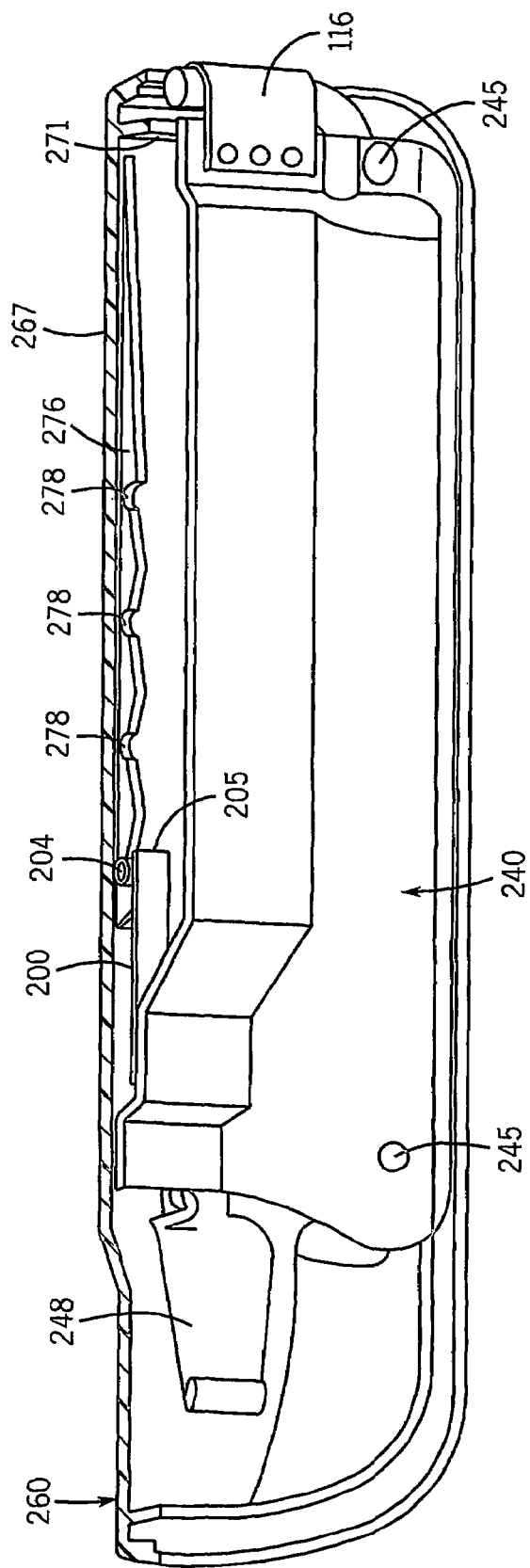
FIG. 14 is a fragmentary cross-sectional view of the detent mechanism employed for allowing the cover to be detentably adjusted with respect to the base of the cover assembly.

The detent mechanism includes a leaf spring 300 having a base 302 which is secured to surface 241 on base 240 by suitable attachment means, such as by rivets or the like. Leaf spring 300 includes a roller follower 304 at an opposite end which extends upwardly into engagement with a rib 276 integral with cover 260 and having a plurality of spaced notches 278 extending downwardly from the center area of cover floor 267, as best seen in FIG. 14. As cover 260 is moved with respect to base 240 by slide 280, follower 304 selectively detents into notches 278 to releasably hold the cover in an adjusted position, such as shown in FIG. 10. As seen in FIG. 14, the cover 260 includes a downwardly extending wall 271 which defines a stop preventing the cover 260 from being withdrawn from the slide assembly 280 by engaging the edge 305 of leaf spring 300. This prevents removal of the cover from slide assembly 280, which is secured to the base 240.

The top surface 243 of base 240 may include a recessed cup holder 250 and a storage tray 252, such that when cover 260 is moved to a forward position, as seen in FIG. 10, the base, which remains over storage compartment 228, provides access to additional vertically stacked storage areas or features which supplement the main storage compartment 228 associated with console 410.

Although the present invention has been described with reference to example embodiments, workers skilled in the art will recognize that changes may be made in form and detail without departing from the spirit and scope of the invention. For example, although different preferred embodiments may have been described as including one or more features providing one or more benefits, it is contemplated that the described features may be interchanged with one another or alternatively be combined with one another in the described preferred embodiments or in other alternative embodiments. Because the technology of the present invention is relatively complex, not all changes in the technology are foreseeable. The present invention described with reference to the example embodiments and set forth in the above claims is manifestly intended to be as broad as possible. For example, unless specifically otherwise noted, the claims reciting a single particular element also encompass a plurality of such particular elements.

The invention claimed is:

1. A vehicle console comprising:
    a body;
    a cover; and
    a pivot arm pivotally coupled to one of the body and the cover, wherein the pivot arm and the other of the body and the cover snap into engagement with one another, wherein the pivot arm includes:
    a projection pivotally coupled to said one of the body and the cover; and a member having a first planar portion and a second planar portion, wherein at least one of the first planar portion and the second planar portion pivots between a closed position in which at least one of the first and second planar portions is mechanically locked to the projection and an open position enabling the projection to be separated from the member, wherein the member engages the body to couple the cover to the body and wherein the body engages the member to retain the member in the closed position.

2. The console of claim 1, wherein one of the projection and the member includes a detent surface and wherein the other of the projection and the member includes a detent-engaging surface.

3. The console of claim 1, wherein the first portion and the second portion pivot about a living hinge.

4. The console of claim 3, wherein the first portion is integrally formed as a single unitary body with the second portion.

5. The console of claim 1, wherein the projection pivots about an axis and wherein the first portion extends along the projection into close proximity with the axis.

6. The console of claim 1, wherein at least a portion of the projection is resilient.

7. The console of claim 6, wherein the projection is formed from at least one resilient metal.

8. The console of claim 7, wherein the at least one resilient metal includes Martinsite.

9. The console of claim 1, wherein the cover includes a rod and wherein the projection at least partially encircles the rod.

10. The console of claim 1, wherein the body includes a recess configured to receive the member.

11. The console of claim 10, wherein the body includes one of a detent surface and a detent-engaging surface in the recess and wherein the member includes the other of a detent surface and a detent-engaging surface.

12. The console of claim 1, wherein the cover includes an armrest.

13. The console of claim 1, wherein the pivot arm is pivotally coupled to the cover.

14. The console of claim 13, wherein the body includes a recess configured to receive the pivot arm.

15. The console of claim 14, wherein the body includes one of a detent surface and a detent-engaging surface in the recess and wherein the pivot arm includes the other of a detent surface and a detent-engaging surface.

16. The console of claim 1, wherein the first and second portions engage opposite sides of the projection.

17. The console of claim 1, wherein the member is configured to connect to both the projection and the other of the body and the cover without fasteners and without adhesive.

* * * * *